No. 661,643. Patented Nov. 13, 1900.
E. S. MOWRY.
FLAGSTAFF HOLDER.
(Application filed July 13, 1900.)
(No Model.)
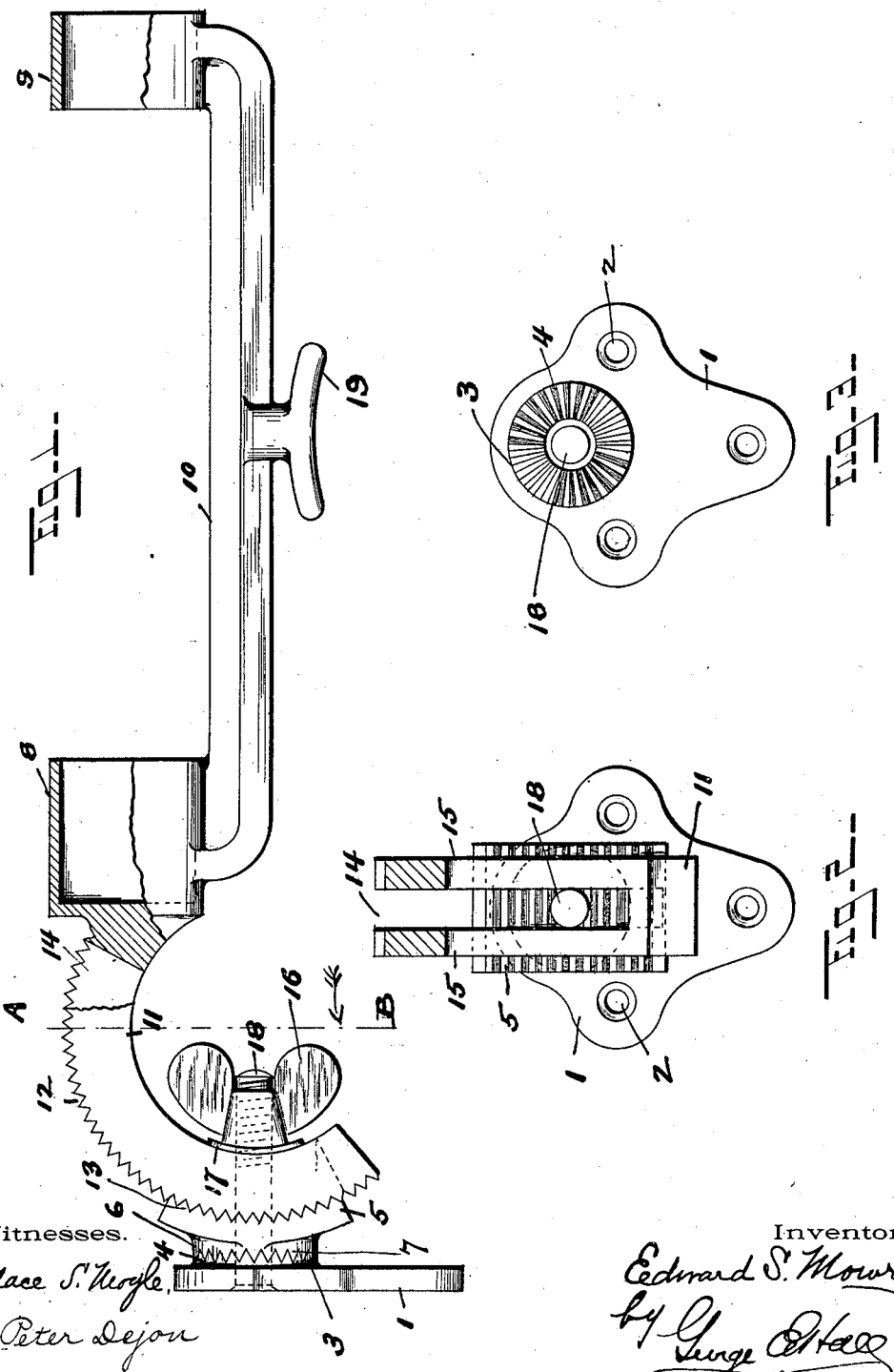
Witnesses.
Wallace S. Nogle
J. Peter Dejou
Inventor.
Edward S. Mowry
by George Otthall
Attorney.

UNITED STATES PATENT OFFICE.

EDWARD S. MOWRY, OF MIDDLETOWN, CONNECTICUT.

FLAGSTAFF-HOLDER.

SPECIFICATION forming part of Letters Patent No. 661,643, dated November 13, 1900.

Application filed July 13, 1900. Serial No. 23,463. (No model.)

*To all whom it may concern:*

Be it known that I, EDWARD S. MOWRY, a citizen of the United States, residing at Middletown, in the county of Middlesex and State of Connecticut, have invented certain new and useful Improvements in Flagstaff-Holders, of which the following is a specification, reference being had to the accompanying drawings.

My invention relates to improvements in flagstaff-holders, its object being, among other things, to construct a flagstaff-holder in which the pole-supporting member may be adjusted to various angles and be held against movement in any of its adjusted positions, and, further, to design and construct the several parts so that they can be readily detached from the base-plate.

To these ends my invention consists in a flagstaff-holder having certain details of construction and combination of parts, as will be hereinafter described, and more particularly pointed out in the claims.

The embodiment of my invention consists, essentially, in a base-plate which is adapted to be secured to the wall of a building or other similar place; a clamp-block having teeth upon two sides thereof, the teeth upon one side engaging with teeth upon the said base-plate, whereby the relative position of the said clamp-block upon the said base-plate may be varied in a plane parallel to said base-plate; a pole-supporting member having a circular rack at one end, the teeth of which engage with teeth upon the said clamp-block, and a locking device, as a stud-bolt and thumb-screw, which bolt passes through the said base-plate, clamp-block, and rack to secure all of the parts together in any of their adjusted positions.

Referring to the drawings, in which like numerals designate like parts in the several views, Figure 1 is a side elevation of the device complete, the pole-socket, segmental rack, and ring being partly in section. Fig. 2 is a section thereof upon line A B looking in the direction of the arrow, with the thumb-nut and washer removed; and Fig. 3 is a plan view of the base-plate.

In the drawings the numeral 1 designates the base-plate, which may be of any preferred form or construction, having suitable countersunk screw-holes 2 therethrough to admit screws for fastening the base-plate to the wall of a building or other similar place and having an integral boss 3 thereon, which boss is provided with a plurality of face-teeth 4, and 5 a clamp-block having a boss 6 thereon, provided with face-teeth 7, which correspond with and mesh into the teeth upon the boss 3, as shown in Fig. 1. The pole-supporting member comprises a socket 8, a ring 9, joined thereto by a tie-bar 10, a segmental rack 11, integral with the socket 8 and having a plurality of teeth 12 in its outer edge, which engage with a plurality of teeth 13 in the face of the clamp-block 5, as shown in Fig. 1. A slot 14 extends through the said rack between the side plates 15 15, and projecting through said slot, clamp-block, and base-plate 1 is a threaded bolt 18, having a thumb-nut 16 and a washer 17 upon one end.

In the drawings the bolt 14 is illustrated as being fastened to the base-plate; but I do not desire to be limited to this construction, as the bolt can be made integral with the base-plate or threaded therein or constructed in any other preferred form within my invention.

It is apparent that by loosening the nut 16 and disengaging the teeth in the rack 11 from the teeth in the clamp-block 5 the angle of inclination of the pole-supporting member can be varied, and when the desired position is obtained the parts can be again securely locked together by turning the thumb-nut 16, the rack and clamp-block teeth engaging with each other and holding the parts against any tendency to slip. To vary the angle of inclination of the pole-supporting member in a plane parallel with the base-plate, the nut 16 is loosened as before and the parts turned about the bolt 18 until the proper position is obtained, when by turning the thumb-nut 16 the parts are again securely fastened in their new position. Preferably integral with the tie-bar 10 is a cleat 19, upon which the flag-ropes may be secured. The intermeshing teeth in the segmental rack, clamp-block, and base-plate are designed to prevent the slipping of one of said parts in relation to each other. In some cases I prefer to make all of the parts without teeth and depend upon friction to hold the parts against displacement.

By the construction herein described the pole-supporting member can be adjusted to any angle within a limited range, either vertically or in a plane parallel with the base-plate, and be secured in any of its adjusted positions and held against accidental movement by the engagement of the teeth in the rack with the teeth in the clamp-block and the teeth in the clamp-block with those of the base-plate. The clamp-block can be made integral with the base-plate, if desired.

There are minor changes and alterations that can be made within my invention aside from those herein described, and I would therefore have it understood that I do not limit myself to the exact construction herein shown and described, but claim all that falls fairly within the spirit and scope of my invention.

What I claim as new is—

1. In a flagstaff-holder, the combination of a base member, a clamp-block arranged upon said base and capable of adjustment with relation to it and having its face curved in an arc of a circle and provided with teeth, and a pole-supporting member having a segmental toothed rack the teeth of which engage with the face-teeth upon the said clamp-block, and means for securing the said members, substantially as described.

2. In a flagstaff-holder, the combination with the base member, of a clamp-block adjustable thereon in a plane parallel therewith and provided on its outer surface with teeth, a pole-supporting member having a segmental toothed rack and adjustable with relation to the clamp-block and the teeth of which are adapted to engage the teeth of said clamp-block in any adjusted position, and means for securing the said members in such adjusted position, whereby the pole-supporting member may be inclined relatively to the base member and also adjusted about its longitudinal axis, substantially as described.

3. In a flagstaff-holder, the combination with the base member, of a clamp-block provided with face-teeth, a pole-supporting member having a segmental toothed rack, said rack being slotted longitudinally, a bolt projecting from the base member through the said slot, and a nut engaging the said bolt and adapted to clamp the several members in any adjusted position, substantially as described.

4. A flagstaff-holder, comprising a base member having a number of teeth, a clamp-block having complemental teeth on one side to engage the teeth on the base member and having teeth on its other side and said other side curved in the arc of a circle, a pole-supporting member having a segmental toothed rack the teeth of which are adapted to engage the teeth of the curved surface of the clamp-block in any adjusted position, and means to bind the several members in adjusted position, substantially as described.

5. A flagstaff-holder, comprising a base member having a number of teeth, a clamp-block having complemental teeth on one side to engage the teeth on the base member and having teeth on its other side and said other side curved in the arc of a circle, a pole-supporting member having a segmental toothed rack the teeth of which are adapted to engage the teeth of the curved surface of the clamp-block in any adjusted position, means to bind the several members in adjusted position, and a cleat for the halyards arranged upon the pole-supporting member, substantially as described.

6. A flagstaff-holder, comprising a base member, a clamp-block adjustable on said base member in a plane parallel therewith, and having its face curved in an arc of a circle, a pole-supporting member having a segmental end adjustably fitted to said curved face of the clamp-block, and means for securing these several members in adjusted position, whereby the pole-supporting member may be inclined relatively to the base member and also adjusted about its longitudinal axis, substantially as described.

In testimony whereof I affix my signature in presence of two witnesses.

EDWARD S. MOWRY.

Witnesses:
H. C. WHITTLESEY,
GEORGE E. WOOD.